United States Patent [19]

Huh

[11] Patent Number: 5,599,073
[45] Date of Patent: Feb. 4, 1997

[54] HYDRAULIC SYSTEM FOR CONTROLLING A BRAKE SYSTEM AND A SUSPENSION SYSTEM OF A WHEEL-TYPE EXCAVATOR

[75] Inventor: Tae-Gyu Huh, Kyung Nam, Rep. of Korea

[73] Assignee: Samsung Heavy Industry Co., Ltd., Kyung-Nam, Rep. of Korea

[21] Appl. No.: 340,629

[22] Filed: Nov. 16, 1994

[30] Foreign Application Priority Data

Dec. 30, 1993 [KR] Rep. of Korea ................ 1993-31448
Nov. 12, 1994 [KR] Rep. of Korea ................... 94-29679

[51] Int. Cl.$^6$ ........................................... B60K 28/16
[52] U.S. Cl. ......................... 303/3; 280/707; 280/714; 303/10
[58] Field of Search .................... 280/707, 714; 303/3, 15, 10, 11, 13; 188/170

[56] References Cited

U.S. PATENT DOCUMENTS

| | | | |
|---|---|---|---|
| 3,482,885 | 12/1967 | Campanini | 303/3 |
| 3,678,684 | 7/1972 | Sorensen . | |
| 3,804,214 | 4/1974 | Shoemaker | 188/107 |
| 4,235,297 | 11/1980 | Porta | 180/6.48 |
| 5,183,127 | 2/1993 | Kageyama et al. | 280/707 |

Primary Examiner—Matthew C. Graham
Attorney, Agent, or Firm—Lieberman & Nowak, LLP

[57] ABSTRACT

A hydraulic system controls a brake system and a suspension system of a wheel-type excavator. The system has a switching section for electrically controlling various systems such as a brake system and a suspension system of the excavator. The system performs various brake functions according to the switching of the switching section. By the system, convenience is provided in handling the switch or operating the systems, and breakage of components which can be happened due to the mis-operation is prevented.

7 Claims, 7 Drawing Sheets

HYDRAULIC SYSTEM FOR CONTROLLING A BRAKE SYSTEM AND A SUSPENSION SYSTEM OF A WHEEL-TYPE EXCAVATOR

BACKGROUND OF THE INVENTION

1. Field of the Invention

The present invention relates to a hydraulic system for controlling a brake system and a suspension system of a heavy equipment for construction capable of travelling, such as a wheel-type excavator, and more particularly to a hydraulic system, by which a brake system and a suspension system of a wheel-type excavator can be operated independently or systematically by operating a single operating means.

2. Prior Arts

In a wheel-type excavator which is one of heavy equipments for construction, a suspension system is a system to perform a buffering function in the course of the travelling of the excavator and to maintain the balance of the excavator while the excavator is operated at an inclined area. Meanwhile, a brake system of a wheel-type excavator has a travel-brake system for braking the excavator having been travelling, a park-brake system for preventing the excavator from falling down when it is parked, and a work-brake system for preventing the excavator from being pushed or pulled by an excavator force thereof in the course of excavating to thereby retain the excavator in a position in a stable manner so as to enable the excavator to perform a stable excavating operation.

Figure 1:
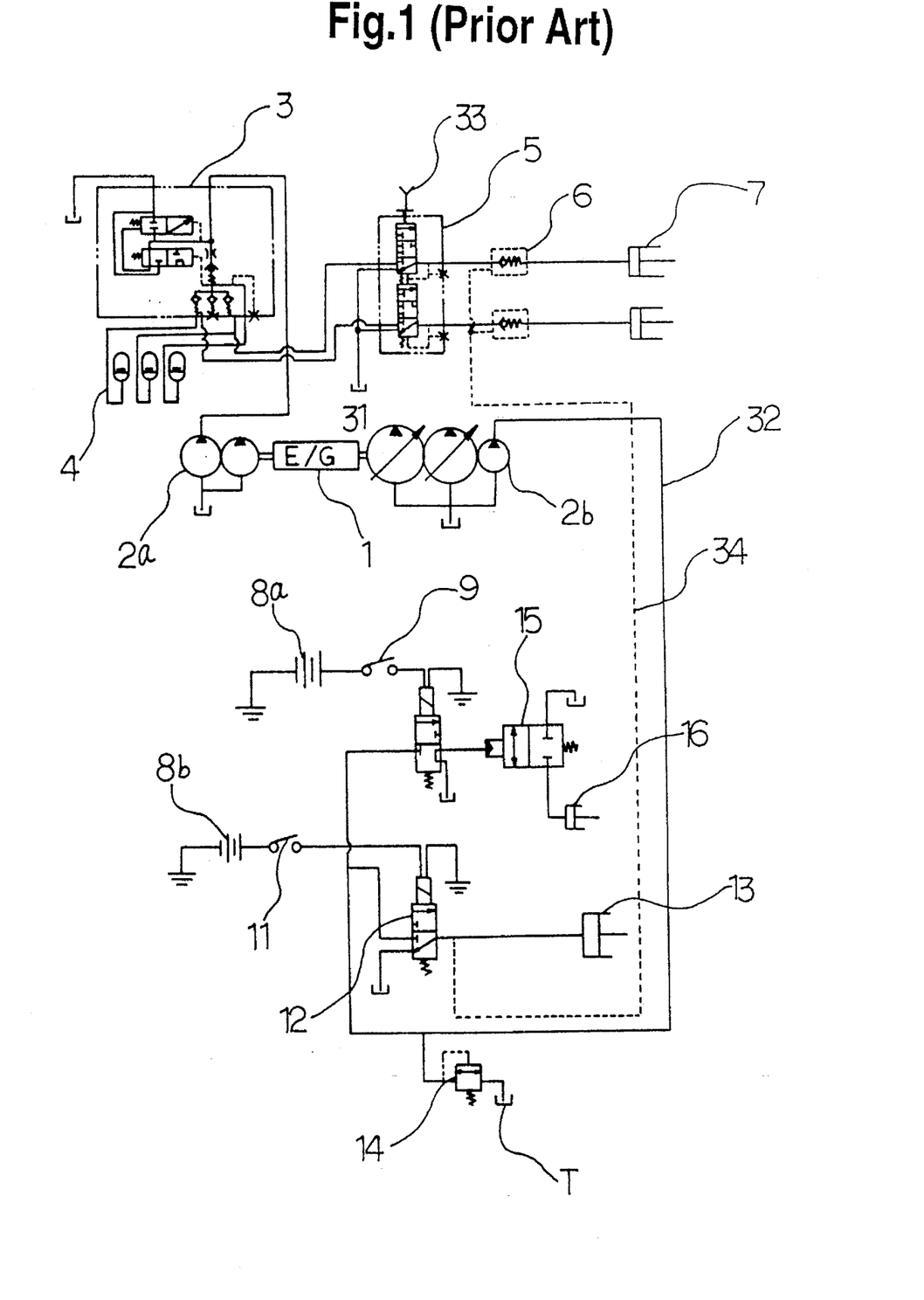
FIG. 1 is a systematic diagram of a brake system and a suspension system of a conventional wheel-type excavator.

FIG. 1 shows a systematic diagram of a brake system and a suspension system of a conventional wheel-type excavator, which include a plurality of hydraulic pumps 2a and 2b driven by a single engine 1, a travel-brake cylinder 7, a park-brake cylinder 13 and a suspension system locking cylinder 16, driven by hydraulic pumps 2a and 2b. A brake cut-off valve 3, a pressure accumulator 4, a travel-brake valve 5, and a pilot check valve 6 are provided in a first oil path 31 interconnecting hydraulic pump 2a and travel-brake cylinder 7, while oil path switching solenoid valves 10 and 12 are respectively disposed between hydraulic pump 2b and park-brake cylinder 13 and between hydraulic pump 2b and suspension system locking cylinder 16 in a second oil path 32. Further, a relief valve 14 is disposed in second oil path 32 so that a predetermined pressure is built up in second oil path 32.

In the meantime, a pedal or a lever 33 handled by an operator is provided at travel-brake valve 5 for operating the travel-brake system, and electric switches 9 and 11 for receiving driving power therethrough from battery 8a and 8b are respectively provided at each of oil path switching solenoid valves 10 and 12 for operating the suspension system and the park-brake system.

In the conventional brake system and suspension system of excavator constructed as described above, when the excavator travels normally, two electric switches 9 and 11 are switched on to make two oil path switching solenoid valves 10 and 12 be switched. In this case, a working oil exhausted from hydraulic pump 2b builds up a pressure in second oil path 32 by relief valve 14, and a suspension system control valve 15 is switched by solenoid valve 10 to make the working oil in suspension system locking cylinder 16 be in an opened-circuit-state so that the suspension system can perform a suspension function.

Further, the pressure is applied through solenoid valve 12 to park-brake cylinder 13 to make the park-brake system be released, and through a pilot line 34 to pilot check valve 6 in first oil path 31 to rid pilot check valve 6 of its direction control function, so that travel-brake cylinder 7 can be operated by travel-brake valve 5 and accordingly the travel-brake system can be operated.

To change a travelling state of the system as described above to a working state thereof, two electric switches 9 and 11 are switched off to make the driving power from batteries 8a and 8b be cut off. When electric switch 11 is off, solenoid valve 12 is switched as shown in FIG. 1 to cut off second oil path 32, and thereby the working oil exhausted from hydraulic pump 2b is returned through second oil path 32 and relief valve 14 disposed in second oil path 32 to a tank T. Further, a pressure having built up in pilot line 34 is removed, and accordingly pilot check valve 6 is restored to have its direction controlling valve. In this state, travel-brake valve 5 is operated by one time, then the working oil exhausted from hydraulic pump 2a is stored in pressure accumulator 4 through brake cut-off valve 3 and then is flowed into the brake system through travel-brake valve 5, so that pressure is continuously built up between pilot check valve 6 and travel-brake cylinder 7 and thereby the park-brake system and the travel-brake system is operated continuously.

Meanwhile, when electric switch 9 is off, suspension system controlling valve 15 is switched as shown in FIG. 1, and accordingly the suspension system is locked. In the brake system and suspension system of the conventional wheel-type excavator, for switching the systems, a lot of switches, and a pedal or a lever must be separately operated, and accordingly there has been a significant inconvenience in handling the system and a possibility of danger to mishandle the switches and the lever.

That is, because the operator must confirm the operation state of the respective sections of the system one by one in detail, the working efficiency is largely lowered. Even in case of mishandling the switches, a fatal damage can be effected on the brake system. As an example, when the excavator is driven to travel in a state that electric switch 11 is on, which is a mishandling accident frequently happened, the park-brake system is broken down.

SUMMARY OF THE INVENTION

The present invention has been made to overcome the above described problems of the conventional hydraulic system, and accordingly it is an object of the present invention is to provide a hydraulic system for controlling a brake system and a suspension system of a wheel-type excavator, by which inconveniences in handling or operating the system are eliminated and breakage of the system due to a mis-operation is prevented.

To achieve the above object, the present provides a hydraulic system for controlling a brake system and a suspension system comprising: a plurality of hydraulic pumps driven by an engine; a park-brake cylinder and a suspension system locking cylinder respectively driven by one and by other of the hydraulic pumps, one of hydraulic pumps being connected to one end of a first oil path; a travel-brake valve disposed between the travel-brake cylinder and the one of the hydraulic pumps; a pilot check valve disposed between the travel-brake valve and the travel-brake cylinder, the pilot check valve being connected to the travel-brake cylinder through a second oil path, the other end of the first oil path being connected to the second oil path; a first oil path switching solenoid valve disposed between the other of the hydraulic pumps and the park-brake cylinder, the first oil path switching solenoid valve being connected to the park-brake cylinder through a third oil path from which a pilot oil path to provide a predetermined oil pressure for switching the pilot check valve is branched; a second oil path switching solenoid valve disposed between the other of the hydraulic pumps and the suspension system locking cylinder; a third oil path switching solenoid valve disposed in the first oil path; a check valve disposed between the third solenoid valve and the park-brake cylinder in the first oil path; a pressure reduction valve disposed between the third solenoid valve and the check valve in the first oil path; and an electric switching means for selectively supplying an electric power to operate the first, second and third solenoid valves separately or systematically.

BRIEF DESCRIPTION OF THE DRAWINGS

The above object, and other features and advantages of the present invention will become apparent by describing the preferred embodiment in detail with reference to the accompanying drawings, in which.

DETAILED DESCRIPTION OF THE PREFERRED EMBODIMENT

Figure 2:
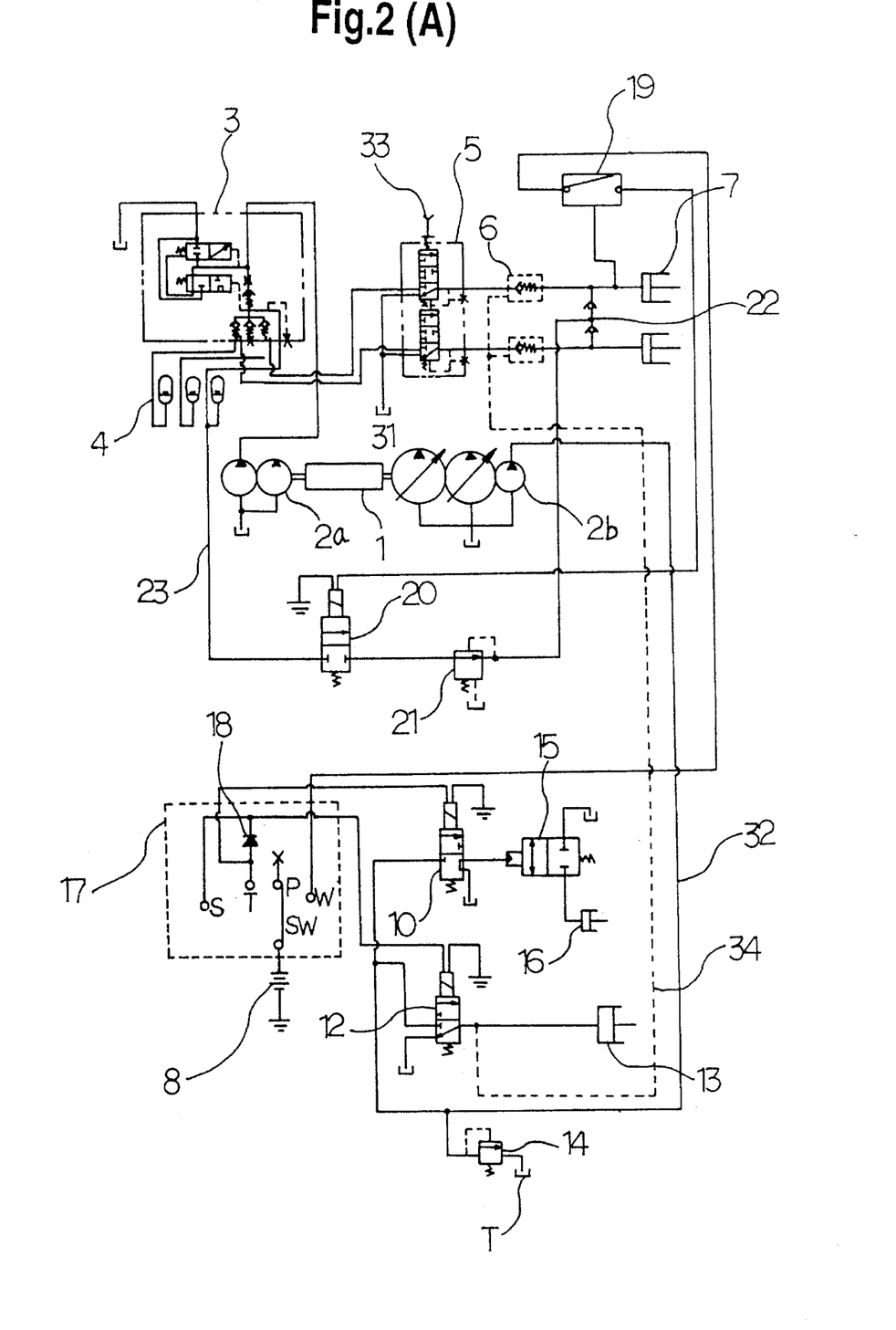
FIGS. 2A, 2B, 2C and 2D are systematic diagrams of a hydraulic system for controlling a brake system and a suspension system of a wheel-type excavator according to one embodiment of the present invention, being operated in several states thereof.

FIGS. 2A and 2B show a hydraulic system for controlling a brake system and a suspension system of a wheel-type excavator according to a first embodiment of the present invention, being operated in several states thereof.

In the following description and the accompanying figures, the same reference numerals designate the same components through the embodiments and a common construction and operation of the system will be described with regard only to the first embodiment, not to the second and third embodiments of the present invention.

Referring to FIG. 2A, a switching section 17 for electrically controlling various systems such as a brake system and a suspension system has a suspension terminal S connected to a solenoid valve 12 used for operating a park-brake cylinder 13, a travel-brake terminal T connected to a solenoid valve 10 used for operating a suspension system locking cylinder 16 and to solenoid valve 12 through a diode 18 used for preventing countercurrent which flows from suspension terminal S to solenoid valve 10, a park-brake terminal P and a work-brake terminal W, and a working switch SW for connecting/cutting off terminals S,T,P, and W to/from a battery 8.

In an oil path between a pilot check valve 6 and a travel-brake cylinder 7, there is provided a pressure switch 19 switched by a pressure applied to the oil path, and one terminal of pressure switch 19 is connected to work-brake terminal W.

A solenoid valve 20, a pressure reduction valve 21 and a check valve 22 are sequentially disposed in an oil path 23 interconnecting a pressure accumulator 4 and travel-brake cylinder 7. By the fact that the terminal of solenoid valve 20 is connected to the other terminal of pressure switch 19, solenoid valve 20 is connected to work-brake terminal W of switching section 17, and when pressure switch 19 is switched on, solenoid valve 20 opens oil path 23 by the electric power from battery 8.

Hereinafter, an operation of the hydraulic system having the above mentioned construction according to the present invention will be described.

In the present invention, various functions including suspension system locking function, travel-brake function, park-brake function and work-brake function are accomplished separately or concurrently by the switching position including suspension system locking position, travel-brake position, park-brake position and work-brake position, of working switch SW of switching section 17.

If working switch SW of switching section 17 is held in the suspension system locking position, only the suspension system is locked, and other brake systems are maintained in a released conditions. If working switch SW is held in the travel-brake position, all brake systems are released; and if working switch SW is held in the park-brake position, park-brake system operates and suspension system is locked. Also, if working switch SW is held in the work-brake position, travel-brake system and park-brake system operate and suspension system is locked.

The above mentioned operation of the hydraulic system will be described in detail hereinafter with reference to FIGS. 2A through 2D.

FIG. 2A shows a park-brake state of the system, in which respective solenoid valves 10, 12, 20 are all switched off, thereby working oil discharged from hydraulic pump 2b is returned to a tank T. Accordingly, as working oil in park-brake cylinder 13 is returned to tank T, the park-brake system is maintained in the park-brake state, suspension system locking cylinder 16 is made to form a closed circuit by a suspension system adjusting valve 15 to lock the suspension system.

FIG. 2B shows a suspension system locking state, in which an electric power supplied from battery 8 to solenoid valve 10 is cut off by diode 18, but the electric power is applied from battery 8 to solenoid valve 12 to switch solenoid valve 12 to opened-circuit-state. As a result, because the working oil supplied from solenoid valve 10 to suspension system locking cylinder 16 is cut off, suspension system locking cylinder 16 is maintained in locking state by a closed circuit, but because the working oil is supplied to park-brake cylinder 13, park-brake system is released. Also, since a portion of the working oil supplied through solenoid valve 12 from hydraulic pump 2b to park-brake cylinder 13 is applied to pilot check valve 6 via pilot line 34, pilot check valve 6 loses its direction control function which adjusts the flow direction of the working oil to release the travel-brake system. Therefore, the travel-brake system is actuated by the operation of travel-brake valve 5. It is understood that in the suspension locking state in which working switch SW is connected with suspension terminal S, the travel-brake system and the park-brake system is maintained in the released condition and the suspension system is locked.

FIG. 2C shows a travel-brake state, in which the electric power is supplied from battery 8 to two solenoid valve 10 and 12, and the two solenoid valve 10 and 12 are switched to open an oil path. Accordingly, the working oil discharged from hydraulic pump 2b is supplied to suspension system adjusting valve 15 through solenoid valve 10, the suspension system adjusting valve 15 is switched into an oil path opening state, suspension system locking cylinder 16 is released by an open circuit. The working oil discharged from hydraulic pump 2b is supplied to park-brake cylinder 13 through solenoid valve 12, and the park-brake system is released. Also, as mentioned in above, since a portion of the working oil discharged from the solenoid valve 12 is applied to pilot check valve 6 via pilot line 34, travel-brake system is released. Accordingly, in this state, all system is maintained in released condition and can be actuated independently.

FIG. 2D shows a work-brake state, in which the electric power is supplied through pressure switch 19 from battery 8 to solenoid valve 20, and solenoid valve 20 is switched to oil path opening position as shown. Therefore, the working oil stored in an pressure reduction valve 4 is travel-brake cylinder 7 through solenoid valve 20, pressure reduction valve 21 and check valve 22. By this, there is formed a closed circuit among pilot check valve 6, travel-brake cylinder 7 and check valve 22.

Accordingly, when a predetermined time has passed and the pressure of the working oil in the closed circuit is reached to a preset pressure, pressure switch 19 is switched off to convert solenoid valve 20 to a state that the oil path is cut off, thereby travel-brake cylinder 7 is locked and the travel-brake system is maintained in a constant-brake state above the preset pressure.

Also, in this case, because the electric power is not supplied from battery 8 to solenoid valve 10 and 12, all the working oil discharged from hydraulic pump 2b is returned to tank T through a relief valve 14 to maintain the travel-brake system and the park-brake system in a locked state, and an closed circuit is formed between suspension system adjusting valve 15 and suspension system locking cylinder 16 to maintain the suspension system in the locked state, also. Therefore, all the travel-brake system, the park-brake system and suspension system are maintained in the locked state.

As described above, in the present embodiment of the invention, various functions including a suspension system locking function, a travel-brake function, a park-brake function and a work-brake function are accomplished separately or concurrently by the switching position including a suspension system locking position, a travel-brake position, a park-brake position and a work-brake position, of working switch SW of switching section 17, thereby the operation of the hydraulic system by an operator can be accomplished in a convenient manner and possibility of mis-operation can be largely reduced.

Figure 3:
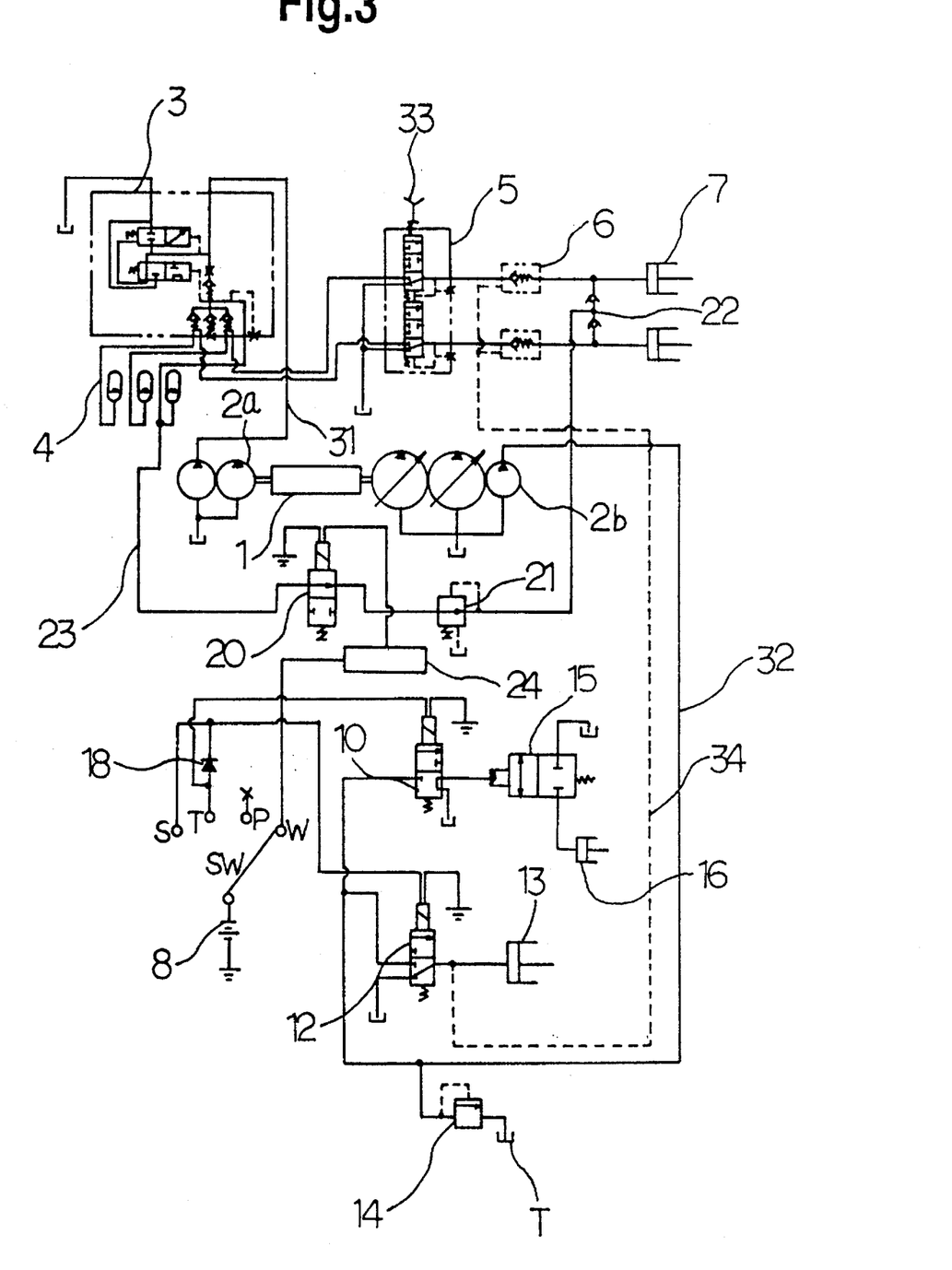
FIG. 3 is a systematic diagram of a hydraulic system for controlling a brake system and a suspension system of a wheel-type excavator according to another embodiment of the present invention.

FIG. 3 shows a hydraulic system for controlling a brake system and a suspension system of a wheel-type excavator according to the second preferred embodiment of the present invention, in which pressure switch 19 used in the first embodiment for switching solenoid valve 20 into the oil path cutting-off state is replaced with a timer 24.

That is, timer 24 is disposed between work-brake terminal W and solenoid valve 20, which are interconnected with each other in switch section 17. Accordingly, an electric power from battery 8 is applied to solenoid valve 20, so that solenoid valve 20 is switched to be an oil path opening state. And, after a predetermined time has passed, the electric power is cut off by timer 24 and thereby solenoid valve 20 is switched to be an oil path cutting off state. In this state, the travel-brake system is locked with maintaining a constant-brake state.

Description of a further construction and operation of the hydraulic system according to the present embodiment, which is the same as those in the first embodiment, will be omitted.

Figure 4:
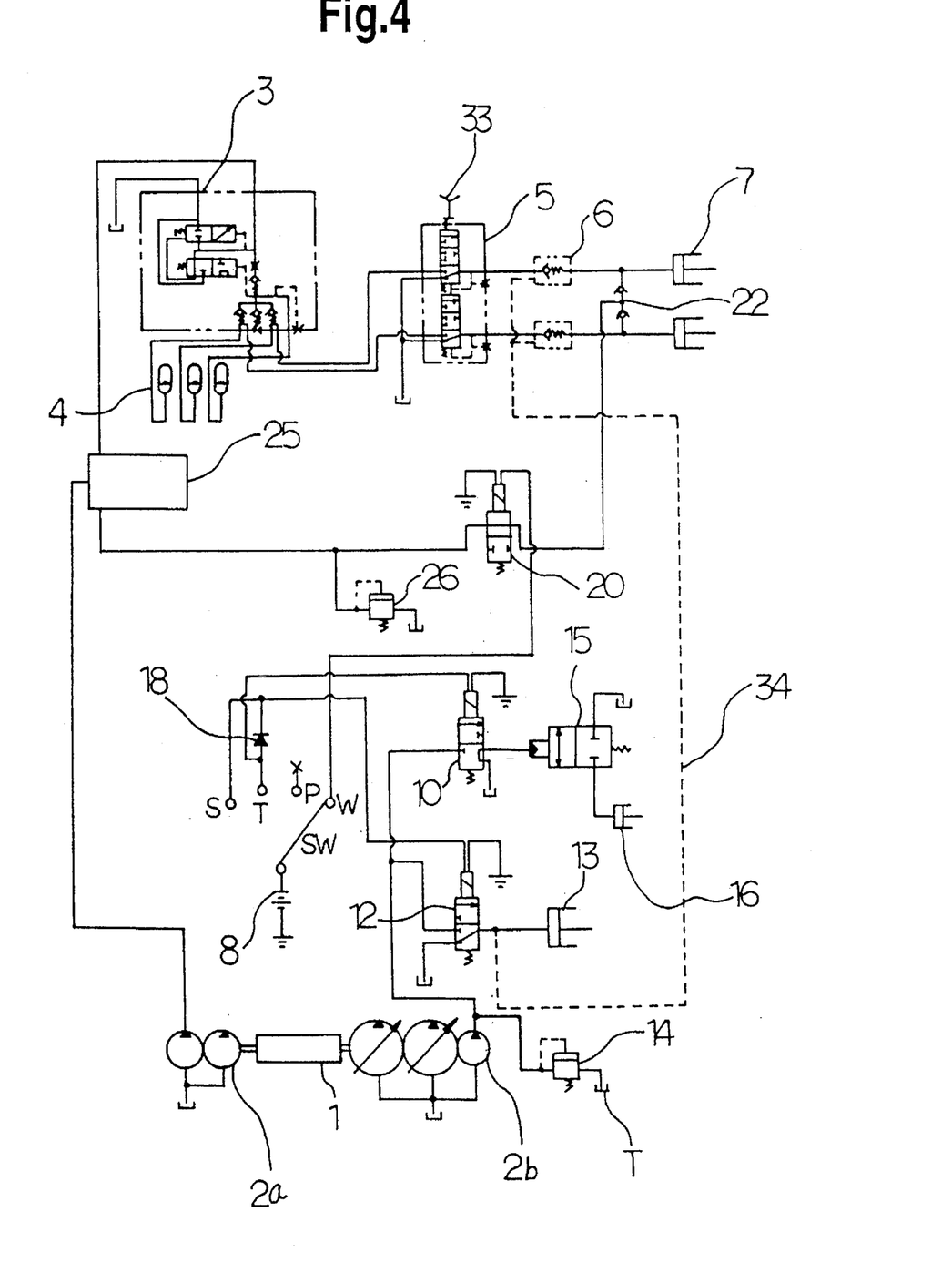
FIG. 4 is a systematic diagram of a hydraulic system for controlling a brake system and a suspension system of a wheel-type excavator according to another embodiment of the present invention.

FIG. 4 shows a hydraulic system for controlling a brake system and a suspension system of a wheel-type excavator according to the third embodiment of the present invention.

The hydraulic system according to the present embodiment has an oil distribution valve 25 and a relief valve 26 instead of power switch 19 in the first embodiment. Oil distribution valve 25 is disposed in oil path 27 through which the working oil exhausted from hydraulic pump 2a is transferred, so that oil path 27 is branched to a first and second oil paths 28a and 28b. First oil path 28a is connected to cut-off valve 3, and second oil path 28b is connected to travel-brake cylinder 7, while in the first and second embodiments, oil path 23 corresponding to second oil path 28b in the third embodiment is branched from pressure accumulator 4. Further, pressure reduction valve 21, solenoid valve 20, and check valve 22 are sequentially disposed in series. Accordingly to the present embodiment, when work switch SW of switch section 17 is switched to be connected to work-brake terminal W, solenoid valve 20 is switched to be an oil path opening state that the working oil exhausted from hydraulic pump 2a is supplied through oil distribution valve 25 to second oil path 28b and then through pressure reduction valve 21, solenoid valve 20, and check valve 22 to travel-brake cylinder 7. In this case, a closed loop is formed between travel-brake cylinder 7 and pilot check valve 6, and accordingly a constant quantity of the work oil is supplied from oil distribution valve 25 to travel-brake cylinder, so that the travel-brake system is locking with being constantly braked. Description of a further construction and operation of the hydraulic system according to the present embodiment, which is the same as those in the first embodiment, will be omitted.

As described above, according to the present invention, the operation of various brake systems and suspension systems under various operation conditions required in a wheel-type excavator is performed by a single incorporated electric switch instead of a plurality of separate handling means, and accordingly complicity of the operation and danger of mishandling or mis-operation are eliminated, and besides convenience is provided in handling the switches or operating the systems and breakage of components which can be happened due to the mis-operation is prevented.

Further, according to the present invention, another advantage is provided that the excavator can travel by itself to an area at which it can be repaired, without an alien help such as a traction by a tractor, even when a significant hitch such as a puncture of a tire of a wheel is happened, because the suspension system can be locked independently.

While the present invention has been described with reference to a few specific embodiments, the description is illustrative of the invention and is not to be construed as limiting the invention. Various modifications may occur to those skilled in the art without departing from the spirit and scope of the invention as defined by the appended claims.

What is claimed is:

1. A hydraulic system for controlling a brake system and a suspension system comprising:

a first and a second hydraulic pump driven by an engine;

a travel-brake cylinder driven by the first hydraulic pump, and a park-brake cylinder and a suspension system locking cylinder driver by the second hydraulic pump;

a travel-brake valve disposed between the first hydraulic pump and the travel-brake cylinder;

a pilot check valve disposed between the travel-brake valve and the travel-brake cylinder;

a first solenoid valve disposed between the second hydraulic pump and the park-brake cylinder and switching an oil path therebetween;

a second solenoid valve disposed between the second hydraulic pump and the suspension system locking cylinder and switching an oil path therebetween;

a pilot oil path branched from an oil path between the first solenoid valve and the park-brake cylinder and providing a predetermined oil pressure for operating the pilot check valve;

a third solenoid valve disposed in an oil path between the first hydraulic pump and a predetermined position of another oil path between the pilot check valve and the travel-brake cylinder;

a check valve disposed between the third solenoid valve and the park-brake cylinder;

a pressure reduction valve disposed between the third solenoid valve and the check valve; and electrical switching means for selectively supplying electric power to operate the first, the second and the third solenoid valves.

2. A hydraulic system for controlling a brake system and a suspension system as claimed In claim 1, wherein the switching means comprises:

a suspension terminal connected to the first solenoid valve;

a travel-brake terminal connected to the second solenoid valve and joined to a wire Interconnecting the suspension terminal with the first solenoid valve so as to be connected to the first solenoid valve;

a park-brake terminal connected to none of the first, second, and third solenoid valves;

a work-brake terminal connected to the third solenoid valve;

a working terminal for connecting/cutting off the terminals to/from an electric power source; and a countercurrent prevention diode disposed between the travel-brake terminal and a joint point at which the suspension terminal and the first solenoid valve are joined, so as to prevent an electric current from flowing from the suspension terminal to the second solenoid valve when the suspension terminal is connected to the electric power source.

3. A hydraulic system for controlling a brake system and a suspension system as claimed in claim 1 or 2, further comprising means for cutting off the electric power having been supplied from the electric power source through the work-brake terminal to the third solenoid valve when a predetermined time has passed after the work-brake terminal is connected to the electric power source so that the third solenoid valve is switched to be an oil path opening state, so as to switch the third solenoid valve to the oil path cutting-off state.

4. A hydraulic system for controlling a brake system and a suspension system as claimed in claim 3, wherein the cut-off means is a pressure switch disposed in a wire interconnecting the work-brake terminal and the third solenoid valve, an initial state of the pressure switch being set as ON and being switched to be OFF by a pressure increase in the second oil path between the pilot check valve and the travel-brake cylinder.

5. A hydraulic system for controlling a brake system and a suspension system as claimed in claim 3, wherein the cut-off means is a timer disposed in a wire interconnecting the third solenoid valve and the work-brake terminal, the timer cutting off an electric current which is supplied from the work-brake terminal to the third solenoid valve when a predetermined time has passed.

6. A hydraulic system for controlling a brake system and a suspension system comprising:

first and second hydraulic pumps driven by an engine; a park-brake cylinder and a suspension system locking cylinder respectively driven by the first and second hydraulic valves;

a travel-brake valve disposed between the travel-brake cylinder and the first of the hydraulic pumps;

a pilot check valve disposed between the travel-brake valve and the travel-brake cylinder;

a first oil path switching solenoid valve disposed between the second of the hydraulic pumps and the park-brake cylinder, the first oil path switching solenoid valve being connected to the park-brake cylinder through a third oil path from which a pilot oil path to provide a predetermined oil pressure for switching the pilot check valve is branched;

a second oil path switching solenoid valve disposed between the second of the hydraulic pumps and the suspension system locking cylinder;

an oil path distribution valve for supplying oil from one of the hydraulic pumps to a fourth and fifth oil path, the fourth oil path being connected to the travel-brake valve, and the fifth oil path being connected to the third oil path between the pilot check valve and the travel-brake cylinder;

a third oil path switching solenoid valve disposed in the fifth oil path;

a check valve disposed between the third solenoid valve and the park-brake cylinder in the fifth oil path;

a pressure reduction valve disposed between the third solenoid valve and the check valve In the fifth oil path; and an electric switching means for selectively supplying electric power to operate the first, second, third solenoid valves.

7. A hydraulic system for controlling a brake system and a suspension system as claimed in claim 6, wherein the switching means comprises:

a suspension terminal connected to the first solenoid valve;

a travel-brake terminal connected to the second solenoid valve and joined to a wire interconnecting the suspension terminal with the first solenoid valve so as to be connected to the first solenoid valve;

a park-brake terminal connected to none of the first, second, and third solenoid valves;

a work-brake terminal connected to the third solenoid valve;

a working terminal for connecting/cutting off the terminals to/from an electric power source; and a countercurrent prevention diode disposed between the travel-brake terminal and a joint point at which the suspension terminal and the first solenoid valve are joined, so as to prevent an electric current from flowing from the suspension terminal to the second solenoid valve when the suspension terminal is connected to the electric power source.

* * * * *